(12) United States Patent
Biswas et al.

(10) Patent No.: US 12,394,405 B2
(45) Date of Patent: Aug. 19, 2025

(54) SYSTEMS AND METHODS FOR RECONSTRUCTING VIDEO DATA USING CONTEXTUALLY-AWARE MULTI-MODAL GENERATION DURING SIGNAL LOSS

(71) Applicant: Verizon Patent and Licensing Inc., Basking Ridge, NJ (US)

(72) Inventors: Subham Biswas, Thane (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 361 days.

(21) Appl. No.: 18/126,212

(22) Filed: Mar. 24, 2023

(65) Prior Publication Data

US 2024/0321260 A1    Sep. 26, 2024

(51) Int. Cl.
*G10L 13/08* (2013.01)
*G06F 40/56* (2020.01)
*G10L 13/027* (2013.01)
*G10L 15/16* (2006.01)
*G10L 15/18* (2013.01)
(Continued)

(52) U.S. Cl.
CPC ............ *G10L 13/027* (2013.01); *G06F 40/56* (2020.01); *G10L 13/08* (2013.01); *G10L 15/16* (2013.01); *G10L 15/1815* (2013.01); *G10L 25/69* (2013.01); *H04N 7/157* (2013.01); *G10L 15/1822* (2013.01); *G10L 15/183* (2013.01); *G10L 15/20* (2013.01); *G10L 15/26* (2013.01);
(Continued)

(58) Field of Classification Search
None
See application file for complete search history.

(56) References Cited

U.S. PATENT DOCUMENTS 8,751,229 B2 *  6/2014  Ljolje .................... G10L 15/19
                                              704/254
9,305,546 B2 *  4/2016  Ljolje .................... G10L 15/19
(Continued)

FOREIGN PATENT DOCUMENTS

CN   112634868 A  *  4/2021  .......... G10L 15/005
CN   114064943 A  *  2/2022
CN   114065720 A  *  2/2022

OTHER PUBLICATIONS

IP.com translation of CN-114065720-A. (Year: 2022).*
(Continued)

*Primary Examiner* — Richard Z Zhu

(57) ABSTRACT

A device may receive video data that includes a text transcript, audio sequences, and image frames, and may detect a network fluctuation. The device may process the text transcript to generate a new phrase, and may generate a response phoneme based on the new phrase. The device may generate a text embedding based on the response phoneme, and may process the audio sequences to generate a target voice sequence. The device may generate an audio embedding based on the target voice sequence, and may process the image frames to generate a target image sequence. The device may generate an image embedding based on the target image sequence, and may combine the embeddings to generate an embedding input vector. The device may generate a final voice response and a final video based on the embedding input vector, and may provide the video data, the final voice response, and the final video.

20 Claims, 16 Drawing Sheets

(51) Int. Cl.
    *G10L 15/26*         (2006.01)
    *G10L 25/69*         (2013.01)
    *H04N 7/15*          (2006.01)
    *G10L 15/183*       (2013.01)
    *G10L 15/20*         (2006.01)
    *G10L 25/30*         (2013.01)
    *G10L 25/57*         (2013.01)
    *G10L 25/60*         (2013.01)

(52) U.S. Cl.
    CPC .............. *G10L 25/30* (2013.01); *G10L 25/57* (2013.01); *G10L 25/60* (2013.01)

(56) References Cited

U.S. PATENT DOCUMENTS

| | | | | |
|---|---|---|---|---|
| 9,773,497 | B2* | 9/2017 | Ljolje | G10L 15/02 |
| 10,217,466 | B2* | 2/2019 | Davies | G10L 21/0364 |
| 11,153,361 | B2* | 10/2021 | Catalano | H04L 41/5025 |
| 2002/0091523 | A1* | 7/2002 | Makinen | G10L 19/005 |
| | | | | 704/258 |
| 2006/0206326 | A1* | 9/2006 | Fukada | G10L 15/187 |
| | | | | 704/E15.044 |
| 2010/0131264 | A1* | 5/2010 | Ljolje | G10L 15/02 |
| | | | | 704/E15.001 |
| 2014/0156268 | A1* | 6/2014 | Arizmendi | G10L 15/1822 |
| | | | | 704/231 |
| 2023/0099732 | A1* | 3/2023 | Mukherjee | G06N 3/0442 |
| | | | | 704/258 |
| 2024/0303874 | A1* | 9/2024 | Chan | G06F 3/011 |

OTHER PUBLICATIONS

IP.com translation of CN-114064943-A. (Year: 2022).*
IP.com translation of CN-112634868-A. (Year: 2021).*
Co-pending U.S. Appl. No. 18/045,893, entitled "Systems and Methods for Reconstructing Voice Packets Using Natural Language Generation During Signal Loss," by Tahiliani et al., filed Oct. 12, 2022, 51 Pages.

* cited by examiner

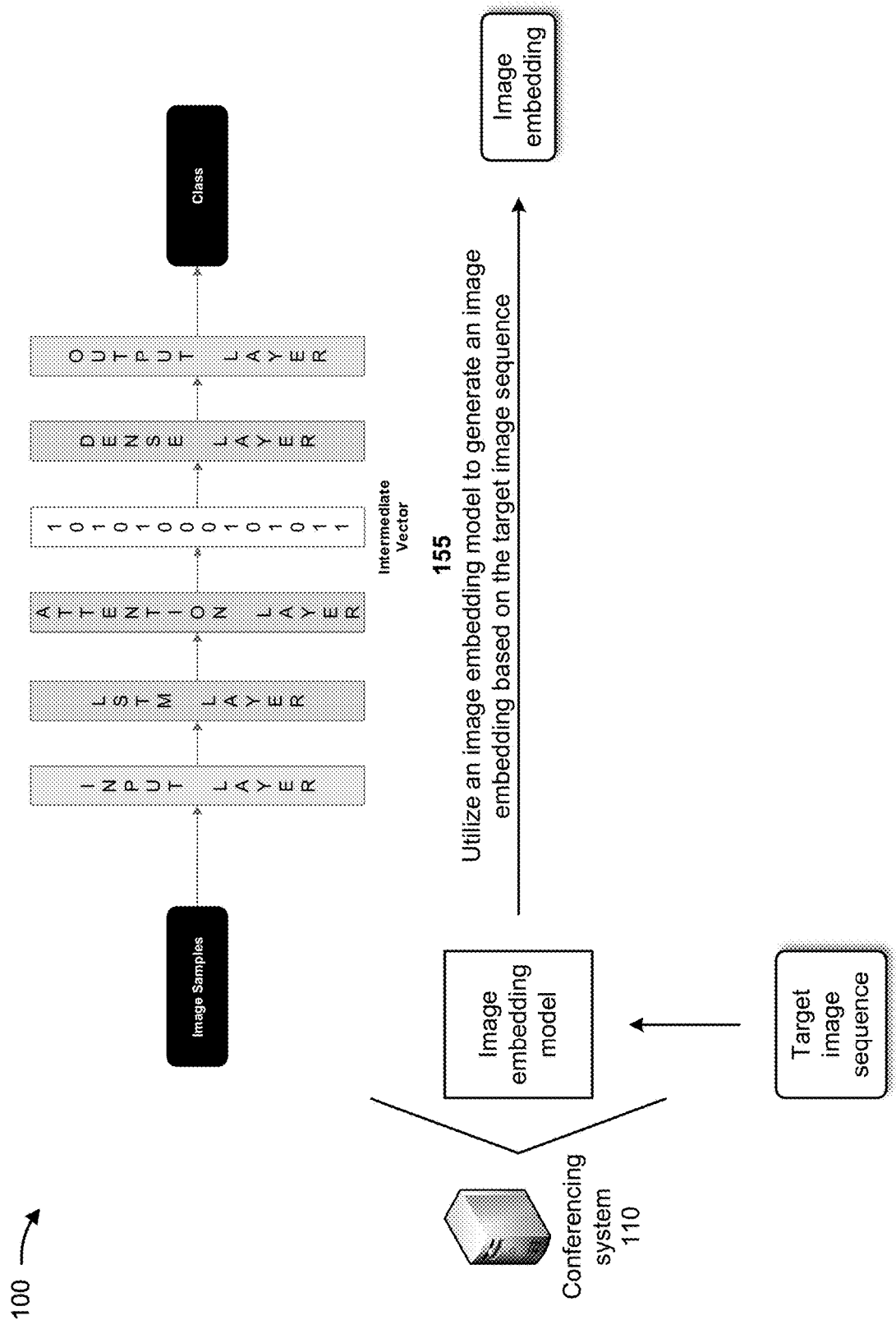

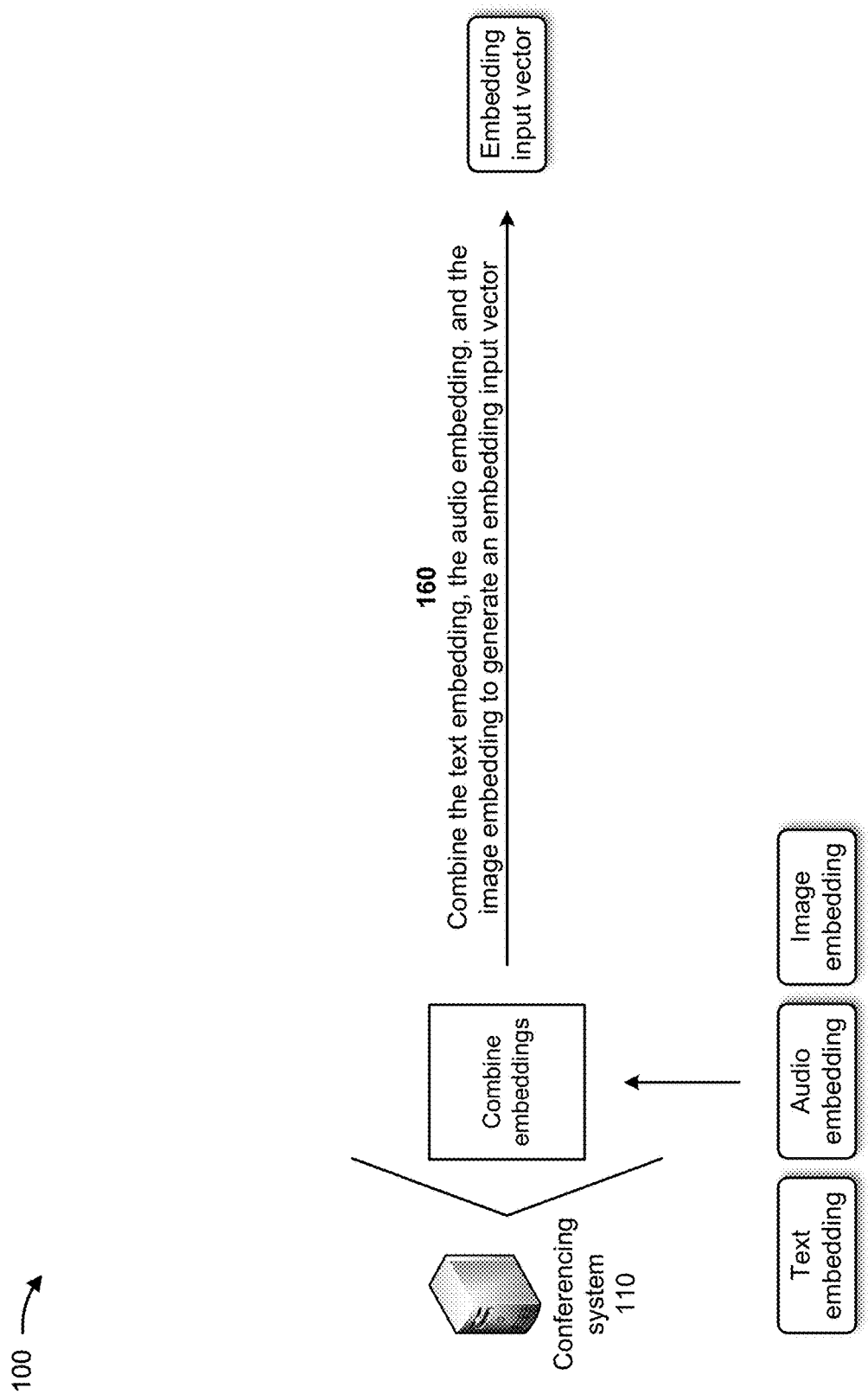

SYSTEMS AND METHODS FOR RECONSTRUCTING VIDEO DATA USING CONTEXTUALLY-AWARE MULTI-MODAL GENERATION DURING SIGNAL LOSS

BACKGROUND

A user device (e.g., a mobile telephone, a tablet computer, a desktop computer and/or the like) may utilize a conferencing application provided by a video conferencing system. The user device may be utilized to conduct video calls with other user devices.

BRIEF DESCRIPTION OF THE DRAWINGS

FIGS. 1A-1L are diagrams of an example associated with reconstructing video data using contextually-aware multi-modal generation during signal loss.

DETAILED DESCRIPTION OF EXAMPLE EMBODIMENTS

Figure 1A:
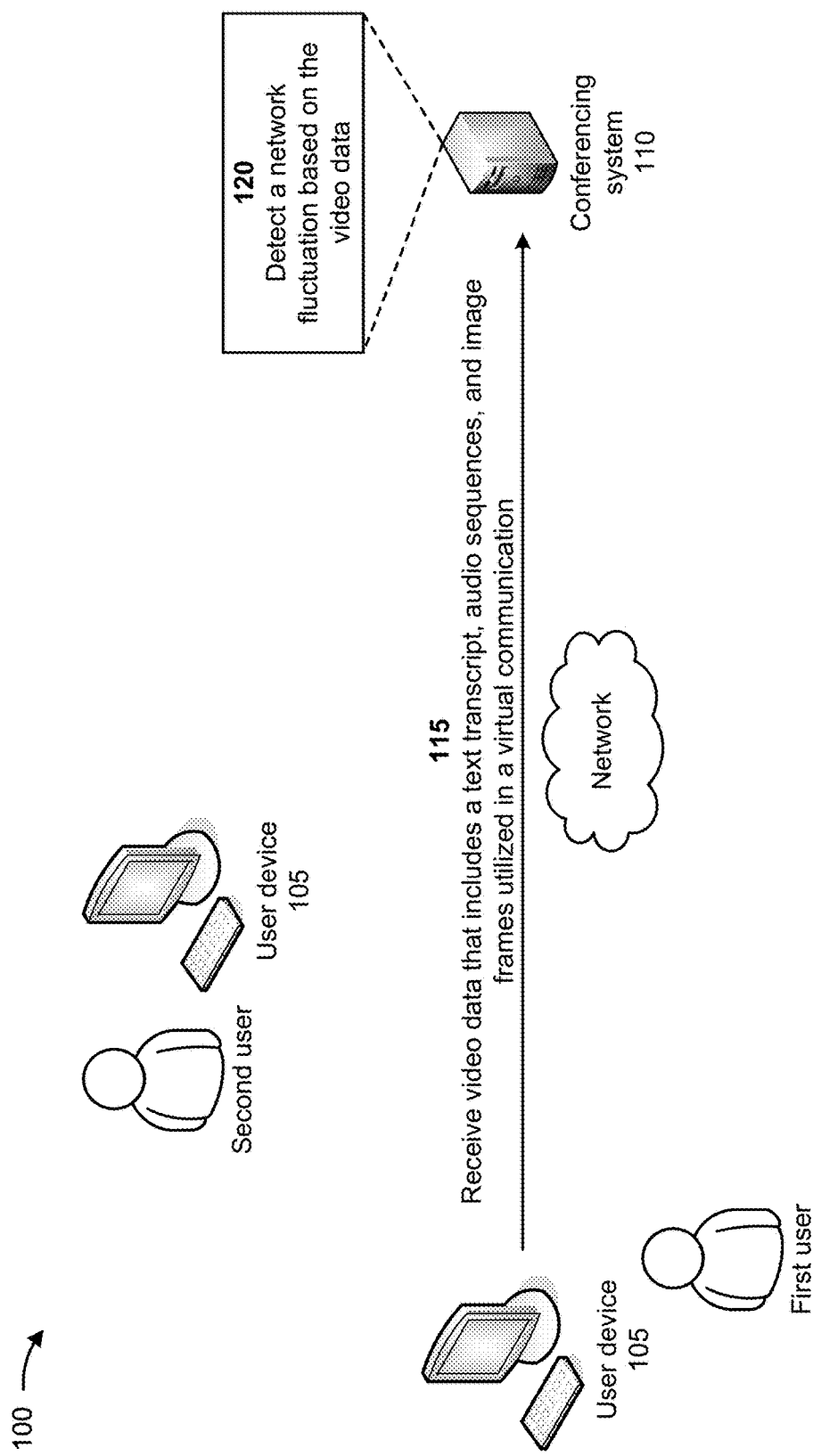

The following detailed description of example implementations refers to the accompanying drawings. The same reference numbers in different drawings may identify the same or similar elements.

A video conferencing system may provide a video conferencing application that enables two-way or multipoint reception and transmission of audio and video signals by user devices in various locations for real time communication (e.g., virtual meetings). A user device may also utilize a telephone application, a communication application, and/or or the like to conduct calls (e.g., audio and video calls) with other user devices. Network issues (e.g., overloading, lag, and/or the like) may be common during virtual meetings and calls and may cause momentary network fluctuations. The network fluctuations may cause a loss of video data (e.g., voice packets and image packets) during a virtual meeting or a call, and may result in lost or misunderstood context. Thus, current techniques for conducting virtual meetings and/or video calls consume computing resources (e.g., processing resources, memory resources, communication resources, and/or the like), networking resources, and/or other resources associated with failing to provide quality video to user devices, resulting in a poor user experience and lost or misunderstood context, losing or dropping packets associated with the video, handling complaints from users associated with the user devices, and/or the like.

Some implementations described herein provide a conferencing system that reconstructs video data using contextually-aware multi-modal generation during signal loss. For example, the conferencing system may receive video data that includes a text transcript, audio sequences, and image frames utilized in a virtual communication, and may detect a network fluctuation based on the video data. The conferencing system may process the text transcript, based on the network fluctuation and with a language model, to generate a new phrase, and may generate a response phoneme based on the new phrase. The conferencing system may utilize a text embedding model to generate a text embedding based on the response phoneme, and may process the audio sequences, based on the network fluctuation and with the language model, to generate a target voice sequence. The conferencing system may utilize an audio embedding model to generate an audio embedding based on the target voice sequence, and may process the image frames, based on the network fluctuation and with an image model, to generate a target image sequence. The conferencing system may utilize an image embedding model to generate an image embedding based on the target image sequence, and may combine the text embedding, the audio embedding, and the image embedding to generate an embedding input vector. The conferencing system may process the embedding input vector, with an audio synthesis model, to generate a final voice response, and may process the embedding input vector, with a frame synthesis model, to generate a final video. The conferencing system may provide the video data, the final voice response, and the final video via the virtual communication.

In this way, the conferencing system reconstructs video conferencing data (e.g., audio and video data) using contextually-aware multi-modal generation during signal loss. For example, the conferencing system may receive video conferencing data that includes a text transcript, audio sequences, and image frames and may detect a network fluctuation based on the video data. The conferencing system may generate a new phrase based on the text transcript and may generate a response phoneme based on the new phrase. The conferencing system may generate a text embedding based on the response phoneme and may generate a target voice sequence based on the audio sequences. The conferencing system may generate an audio embedding based on the target voice sequence and may generate a target image sequence based on the image frames. The conferencing system may generate an image embedding based on the target image sequence and may combine the text embedding, the audio embedding, and the image embedding to generate an embedding input vector. The conferencing system may generate a final voice response and a final video based on the embedding input vector and may provide the video data, the final voice response, and the final video via a virtual communication. Thus, the conferencing system may conserve computing resources, networking resources, and/or other resources that would have otherwise been consumed by failing to provide quality video to user devices, resulting in a poor user experience and lost or misunderstood context, losing or dropping packets associated with the video, handling complaints from users associated with the user devices, and/or the like.

Although implementations are described in connection with the conferencing system, the implementations described herein may be provided in user devices and/or any video-based conversation device prone to network signal fluctuations. For example, the implementations described herein may be included in a module that is provided in a user device.

FIGS. 1A-1L are diagrams of an example 100 associated with reconstructing video data using contextually-aware multi-modal generation during signal loss. As shown in FIGS. 1A-1L, example 100 includes user devices 105 associated with users (e.g., a first user and a second user) and a conferencing system 110. Further details of the user devices 105 and the conferencing system 110 are provided elsewhere herein.

As shown in FIG. 1A, and by reference number 115, the conferencing system 110 may receive video data that includes a text transcript, audio sequences, and image frames utilized in a virtual communication. For example, the first user may utilize a first user device 105 to conduct a video conference, a virtual meeting, a video call, and/or the like with a second user device 105 and the second user. In one example, the conferencing system 110 may provide, to the user devices 105 and via a network (e.g., a data network, a telecommunications network, and/or the like), a conferencing application that enables the first user and the second user to conduct a video communication. During the video communication, the first user may capture video of the first user with the first user device 105, and the first user device 105 may receive the video from the first user and convert the video into video data that includes packets of audio (e.g., voice packets) and video (e.g., image packets). The text transcript may include text of the speech (e.g., the voice packets) captured by the first user device 105. The first user device 105 may provide the video data that includes the text transcript, the audio sequences, and the image frames to the conferencing system 110, via the network, and the conferencing system 110 may receive the video data in real time or near-real time.

In some implementations, the conferencing system 110 may not receive the text transcript and may convert the audio sequences to the text transcript in real time. For example, the conferencing system 110 may process the audio sequences, with a speech-to-text converter model, to convert the audio sequences to the text transcript in real time. The speech-to-text converter model may include a model that enables recognition and translation of spoken language into text. The speech-to-text converter model may include a hidden Markov model, a dynamic time warping (DTW)-based speech recognition model, a neural network model (e.g., a deep feedforward and recurrent neural network model), and/or the like. In some implementations, the speech-to-text converter model may be provided by various speech-to-text services.

As further shown in FIG. 1A, and by reference number 120, the conferencing system 110 may detect a network fluctuation based on the video data. For example, the conferencing system 110 may analyze the voice packets and the image packets, and may determine whether any voice packets or image packets are missing from the video data based on analyzing the voice packets and the image packets. In some implementations, the conferencing system 110 may compare a quantity the voice packets or image packets to a standard network functionality and/or threshold to determine whether the quantity of the voice packets or image packets is less than or more than a threshold quantity of dropped packets. In some implementations, the conferencing system 110 may determine that no voice packets or image packets are missing from the video data based on analyzing the voice packets and the image packets. In such implementations, the conferencing system 110 may process the video data in a conventional manner for the virtual communication. In some implementations, the conferencing system 110 may determine that a threshold quantity of voice packets or image packets are missing from the video data based on analyzing the voice packets and the image packets, and may determine that the missing voice packets or image packets are caused by a network fluctuation associated with the network. In such implementations, the conferencing system 110 may process the video data in a manner described herein.

Issues with the network (e.g., network overloading, network lag, and/or the like) may occur during the virtual communication and may cause momentary network fluctuations. The network fluctuations may cause a loss of video data (e.g., missing voice packets or image packets) during the virtual communication, and may result in lost or misunderstood context. In some implementations, the conferencing system 110 may receive, from the network, network data identifying a connectivity of the network, a throughput of the network, a bandwidth of the network, and/or the like, and may detect the network fluctuation based on the network data.

Figure 1B:
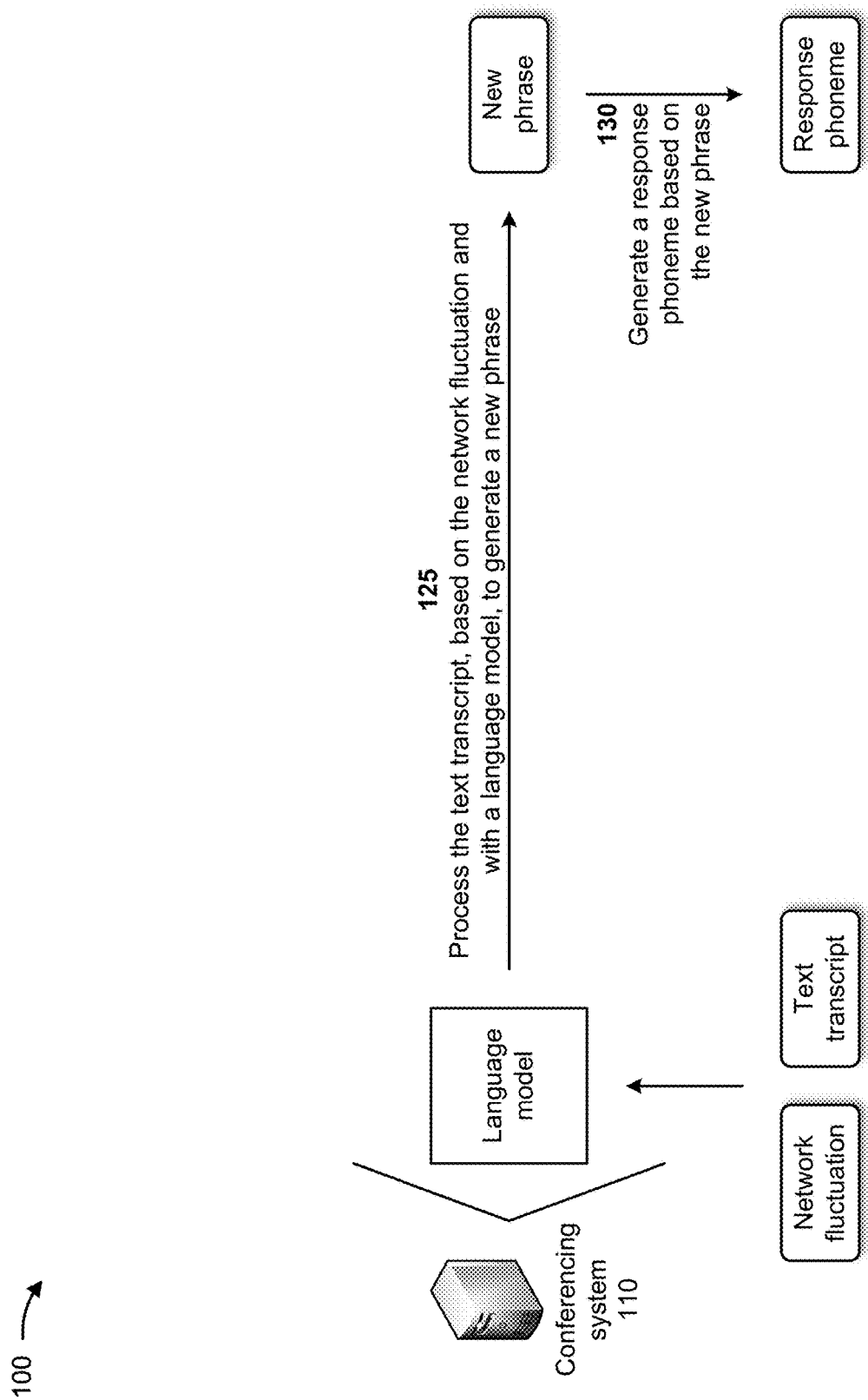

As shown in FIG. 1B, and by reference number 125, the conferencing system 110 may process the text transcript, based on the network fluctuation and with a language model, to generate a new phrase. For example, since the video data is missing voice packets, the text transcript generated from the video data may be missing text resulting in partial text in the text transcript. The language model may include an encoder-decoder model that determines relationships between different words and phrases and that represents words while maintaining connections between the words. The language model may include logic that recommends next words for missing text based on the partial text and context of the text transcript. For example, if the partial text is an adjective, the language model may predict that the next text is a noun; if the partial text is a verb, the language model may predict that the next text is a noun; if the partial text is a noun and a connector (e.g., and, or, etc.), the language model may predict that the next text is a noun; if the partial text is a verb and the word "in," the language model may predict that the next text is a noun; and/or the like. In some implementations, the language model may generate a new phrase to utilize for the missing text in the text transcript.

As further shown in FIG. 1B, and by reference number 130, the conferencing system 110 may generate a response phoneme based on the new phrase. For example, the conferencing system 110 may process the new phrase, with a phoneme generation model, to generate the response phoneme. In one example, if the new phrase is "I am sorry to hear that. Let me help you fix this," the phoneme generation model may generate the response phoneme to be "aɪ æm ˈsɑri tu hir dæt. lɛt mi hɛlp ju fiks dɪs." In some implementations, the phoneme generation model may include a grapheme-to-phoneme transduction model, such as an epitran model, a phonemizer model, a toPhonetics model, and/or the like. The "epitran" model may include a model that receives word tokens in an orthography of a language and outputs a phonemic representation of the word tokens. The "phonemizer" model may include a model that generates phonemization of words and texts in many languages. The "toPhonetics" model may include a model that converts text into a phonetic transcription using the international phonetic alphabet.

Figure 1C:
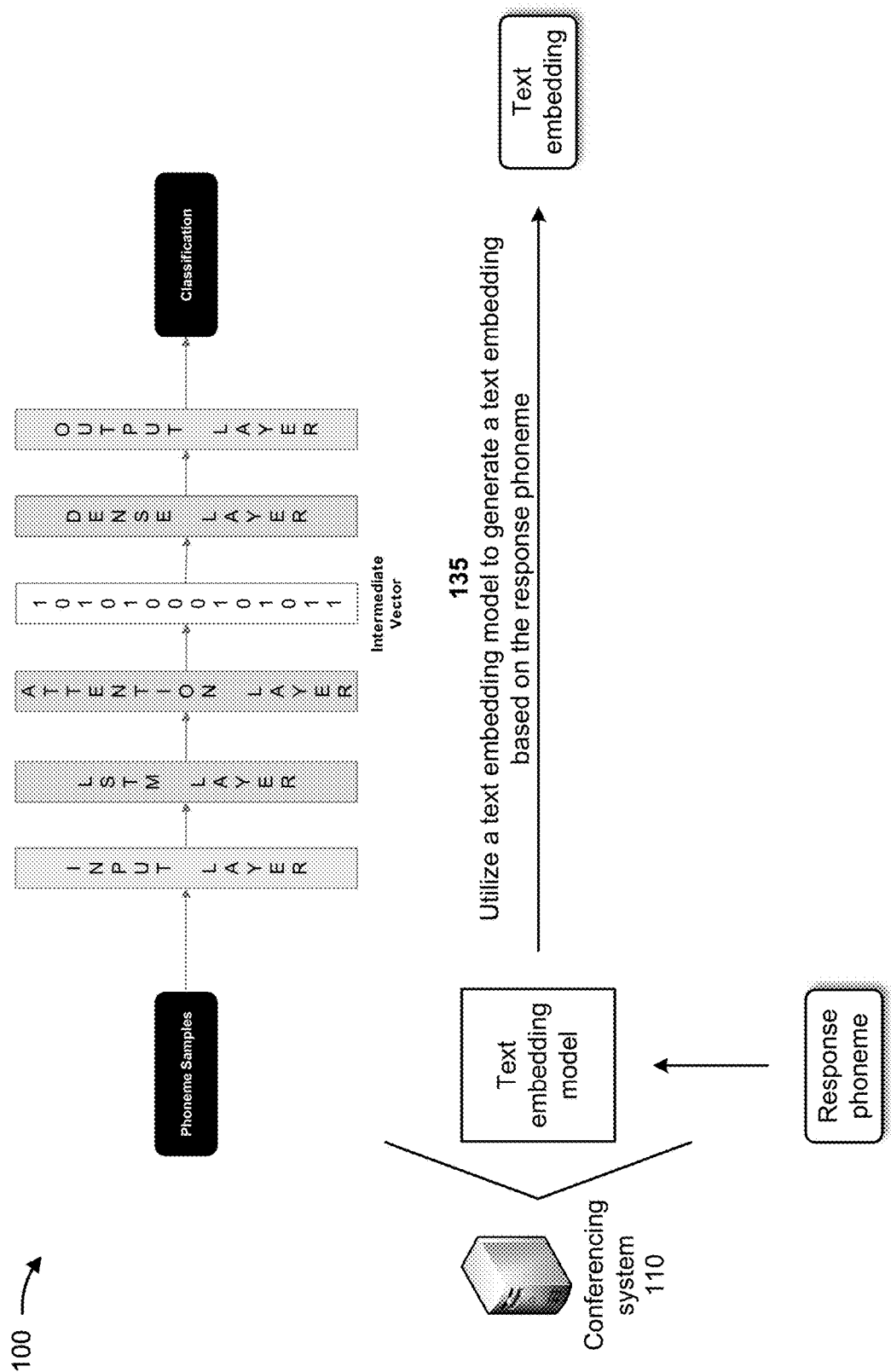

As shown in FIG. 1C, and by reference number 135, the conferencing system 110 may utilize a text embedding model to generate a text embedding based on the response phoneme. For example, the conferencing system 110 may include a text embedding model that is trained by the conferencing system 110 or trained by another system and received by the conferencing system 110 from the other system. In some implementations, the text embedding model is a text classification neural network model that is trained for text classification to generate a trained model. Further details of training a machine learning model are provided below in connection with FIG. 2. A dense layer and an output layer of the trained model may be removed from the trained model so that a dense vector output of an intermediate layer of the trained model acts as a text embedding. In some implementations, the text embedding model is a sequential multilayer perceptron model. The conferencing system 110 may process the response phoneme, with the text embedding model, to generate the text embedding (e.g., an intermediate vector).

Figure 1D:
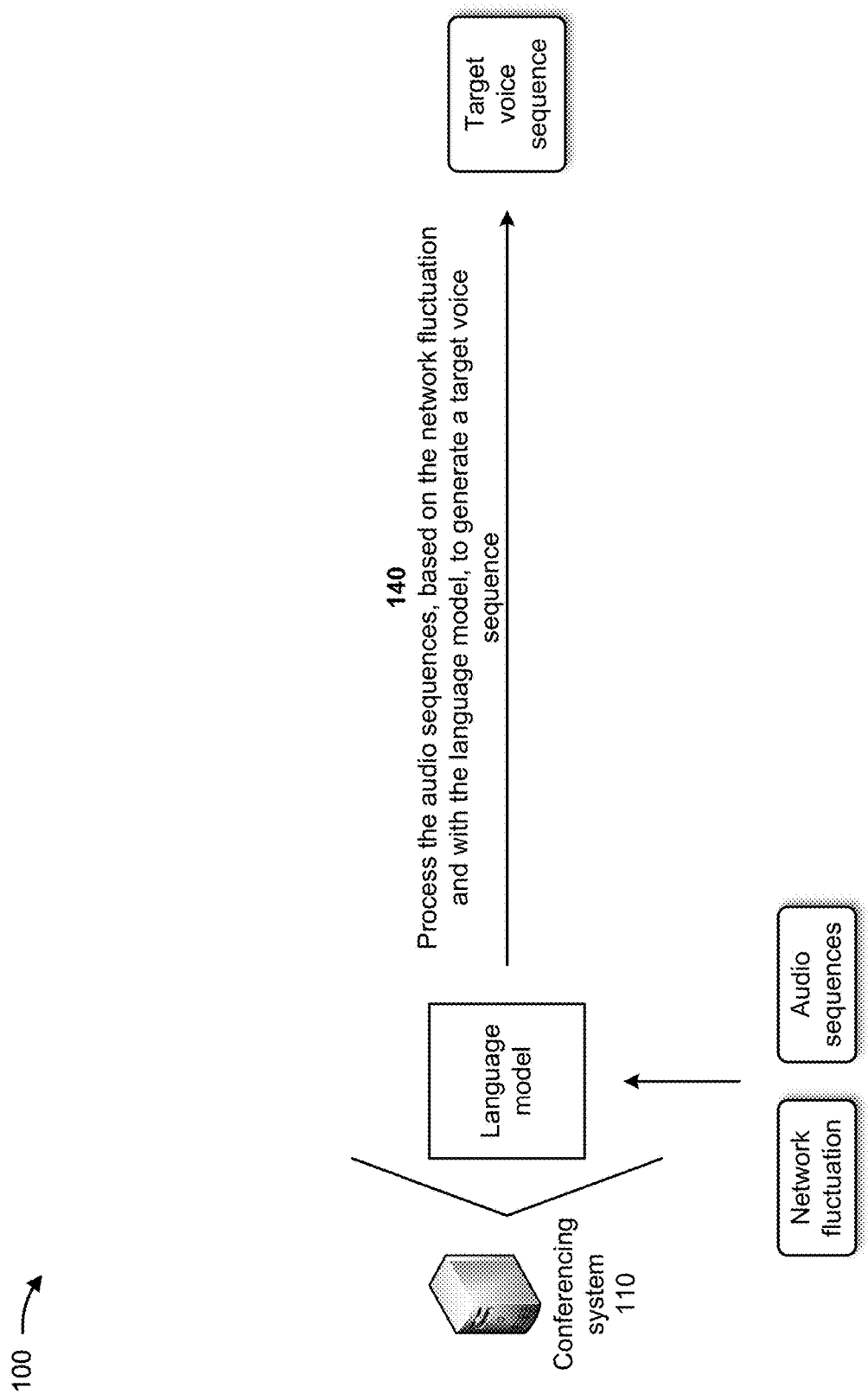

As shown in FIG. 1D, and by reference number 140, the conferencing system 110 may process the audio sequences, based on the network fluctuation and with the language model, to generate a target voice sequence. For example, due to the network fluctuation, the conferencing system 110 may process the voice packets of the audio sequences, with the language model, to generate a target voice sequence that includes a tone, an amplitude, a frequency, and/or the like associated with a voice of a speaker (e.g., the first user of the first user device 105). The language model may include a voice recognition model that determines a voiceprint of the speaker based on the audio sequences. The voice recognition model may identify and authenticate a person based on sounds that the person makes when the person speaks, and may measure unique biological factors that make each voiceprint unique.

Figure 1E:
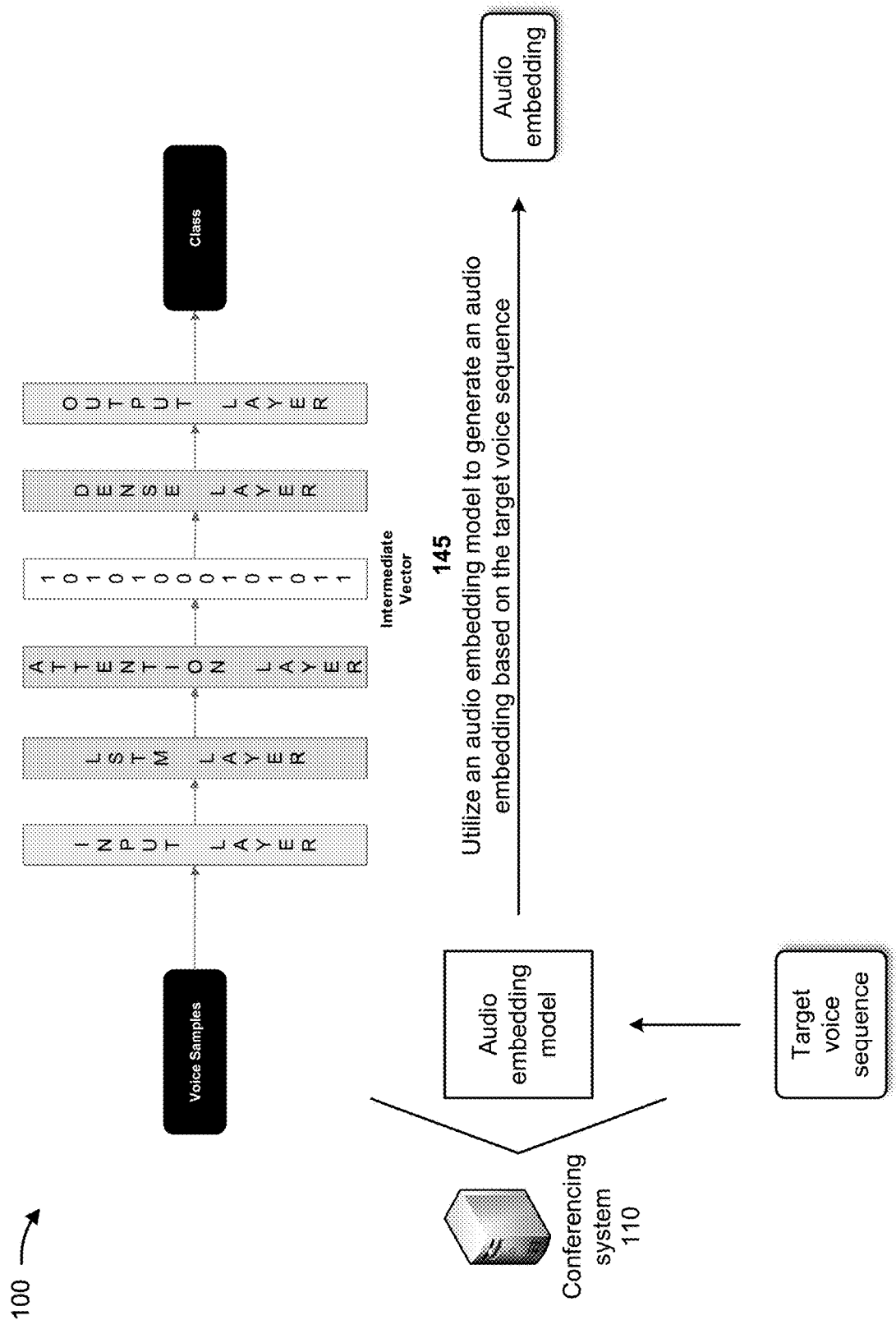

As shown in FIG. 1E, and by reference number 145, the conferencing system 110 may utilize an audio embedding model to generate an audio embedding based on the target voice sequence. For example, the conferencing system 110 may include an audio embedding model that is trained by the conferencing system 110 or trained by another system and received by the conferencing system 110 from the other system. In some implementations, the audio embedding model is an audio classification neural network model that is trained for audio classification to generate a trained model. Further details of training a machine learning model are provided below in connection with FIG. 2. A dense layer and an output layer of the trained model may be removed from the trained model so that a dense vector output of an intermediate layer of the trained model acts as an audio embedding. In some implementations, the audio embedding model is a sequential multilayer perceptron model. The conferencing system 110 may process the target voice sequence, with the audio embedding model, to generate the audio embedding (e.g., an intermediate vector).

Figure 1F:
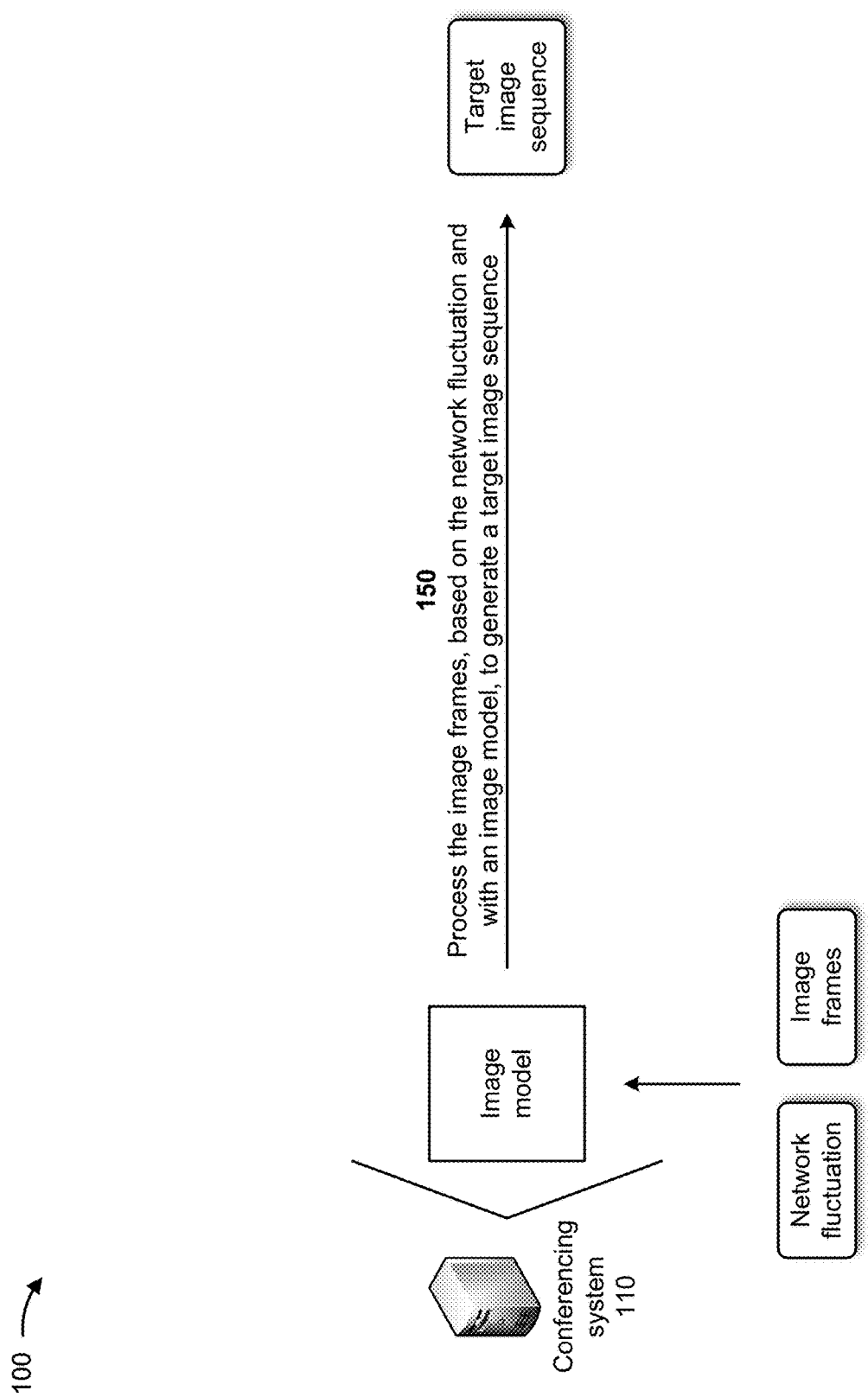

As shown in FIG. 1F, and by reference number 150, the conferencing system 110 may process the image frames, based on the network fluctuation and with an image model, to generate a target image sequence. For example, due to the network fluctuation, the conferencing system 110 may process the image packets of the image frames, with the image model, to generate a target image sequence that includes one or more image frames (e.g., three-dimensional red, green, and blue (RGB) array with pixel values ranging from zero (0) to two-hundred and fifty-five (255)) associated with an image of a speaker (e.g., the first user of the first user device 105). The image model may include an image recognition model that determines an image of the speaker based on the image frames. The image recognition model may identify and authenticate a person based on an image of the person, and may measure unique biological factors that make each person's image unique.

As shown in FIG. 1G, and by reference number 155, the conferencing system 110 may utilize an image embedding model to generate an image embedding based on the target image sequence. For example, the conferencing system 110 may include an image embedding model that is trained by the conferencing system 110 or trained by another system and received by the conferencing system 110 from the other system. In some implementations, the image embedding model is an image classification neural network model that is trained for image classification to generate a trained model. Further details of training a machine learning model are provided below in connection with FIG. 2. A dense layer and an output layer of the trained model may be removed from the trained model so that a dense vector output of an intermediate layer of the trained model acts as an image embedding. In some implementations, the image embedding model is a sequential multilayer perceptron model. The conferencing system 110 may process the target image sequence, with the image embedding model, to generate the image embedding (e.g., an intermediate vector).

As shown in FIG. 1H, and by reference number 160, the conferencing system 110 may combine the text embedding, the audio embedding, and image embedding to generate an embedding input vector. For example, the conferencing system 110 may combine the text embedding, the audio embedding, and image embedding to generate an embedding input vector that includes audio metadata (e.g., a tone, an amplitude, a frequency, and/or the like of the voice of the first user), textual semantic and syntactic information, and image metadata (e.g., facial features of the first user, color gradients, edges, pixel variations, and/or the like). In some implementations, the conferencing system 110 may generate the embedding input vector by concatenating the text embedding, the audio embedding, and image embedding.

Figure 1I:
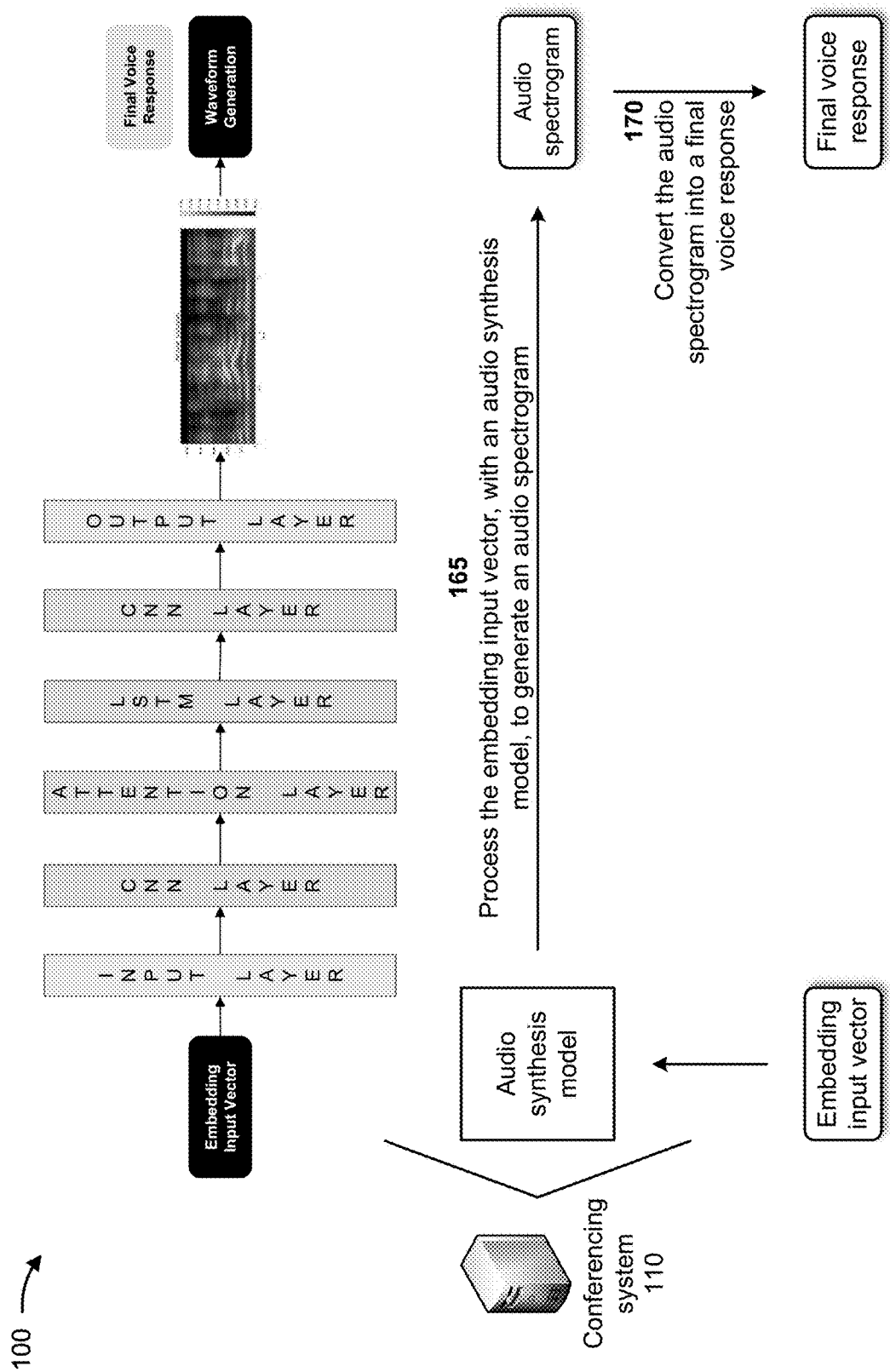

As shown in FIG. 1I, and by reference number 165, the conferencing system 110 may process the embedding input vector, with an audio synthesis model, to generate an audio spectrogram. For example, the conferencing system 110 may include an audio synthesis model that is a convolutional neural network (CNN) model with an input layer, a first CNN layer, an attention layer, a long short-term memory (LSTM) layer, a second CNN layer, and an output layer. In some implementations, the conferencing system 110 may process the embedding input vector, with the CNN model, to generate an audio spectrogram image as a three-dimensional RGB array with pixel values ranging from zero (0) to two-hundred and fifty-five (255).

As further shown in FIG. 1I, and by reference number 170, the conferencing system 110 may convert the audio spectrogram into a final voice response. For example, the conferencing system 110 may include a waveform generator that converts the audio spectrogram into a final voice response. The final voice response may include voice packets that, when played back, state the new phrase in the voice of the first user (e.g., in a simulated voice of the first user).

Figure 1J:
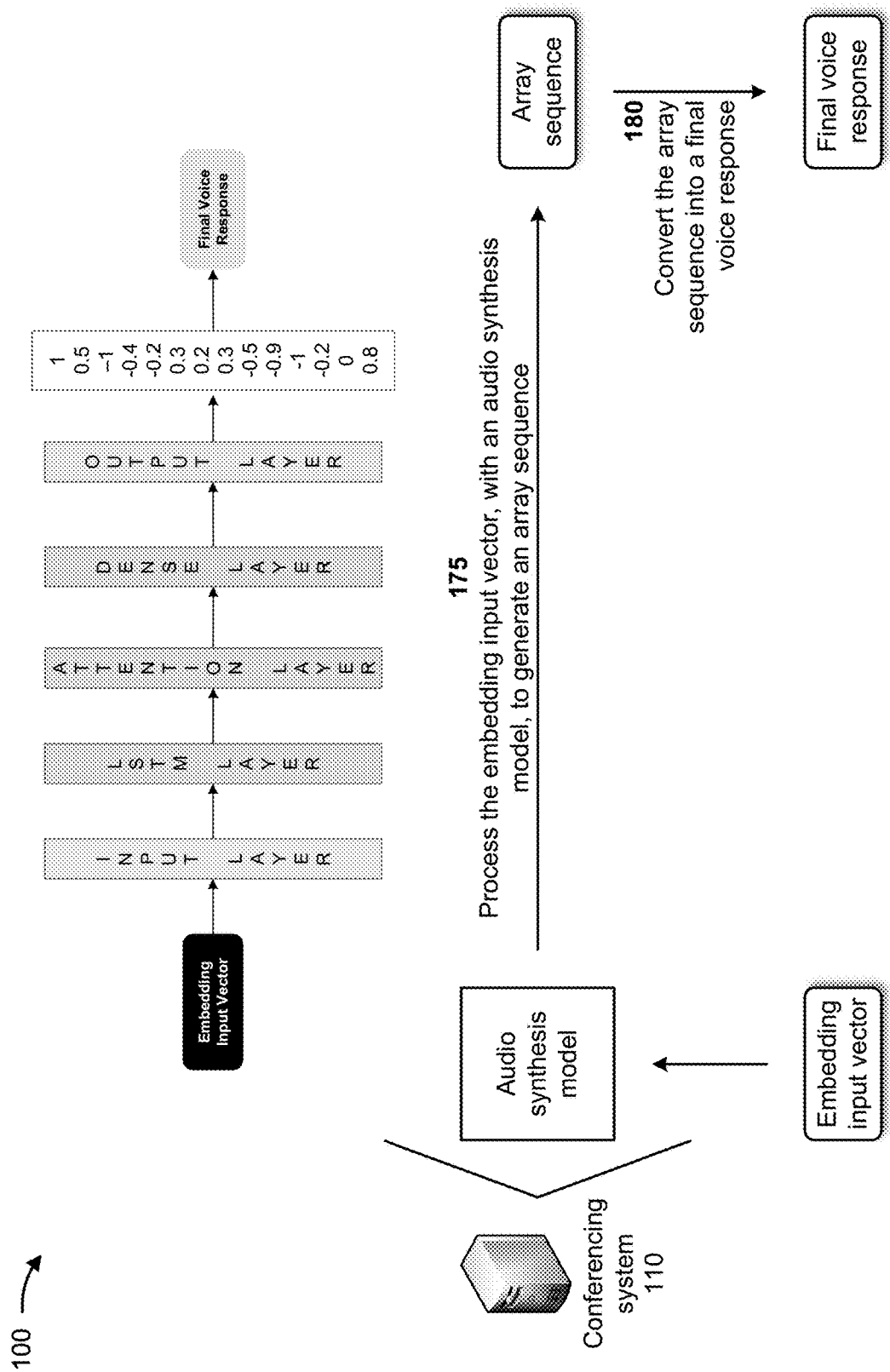

As shown in FIG. 1J, and by reference number 175, the conferencing system 110 may process the embedding input vector, with an audio synthesis model, to generate an array sequence. For example, the conferencing system 110 may include an audio synthesis model that is a neural network model with an input layer, an LSTM layer, an attention layer, a dense layer, and an output layer. In some implementations, the conferencing system 110 may process the embedding input vector, with the neural network model, to generate an array sequence as a one-dimensional array vector that includes an amplitude versus time for an audio sample.

Figure 1K:
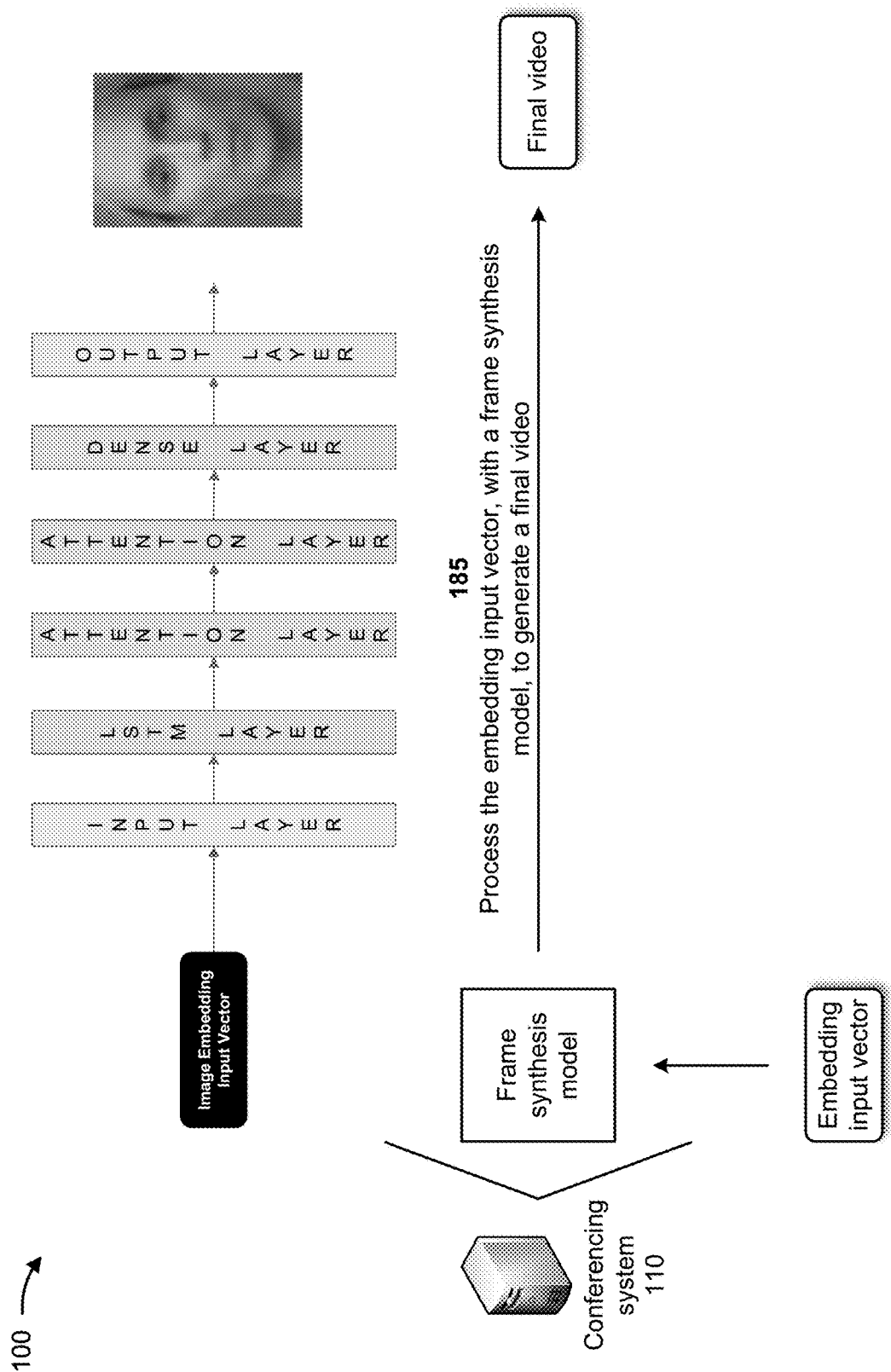

As further shown in FIG. 1J, and by reference number 180, the conferencing system 110 may convert the array sequence into a final voice response. For example, the conferencing system 110 may include a waveform generator that converts the array sequence into a final voice response. The final voice response may include voice packets that, when played back, state the new phrase in the voice of the first user (e.g., in a simulated voice of the first user). As shown in FIG. 1K, and by reference number 185, the conferencing system 110 may process the embedding input vector, with a frame synthesis model, to generate a final video. For example, the conferencing system 110 may include a frame synthesis model that is a neural network model with an input layer, an LSTM layer, an attention layer, a dense layer, and an output layer. In some implementations, the conferencing system 110 may process the embedding input vector, with the neural network model, to generate the final video as a one-dimensional array vector. The final video may include image packets that, when played back, show the first user (e.g., a face of the first user) stating the new phrase.

Figure 1L:
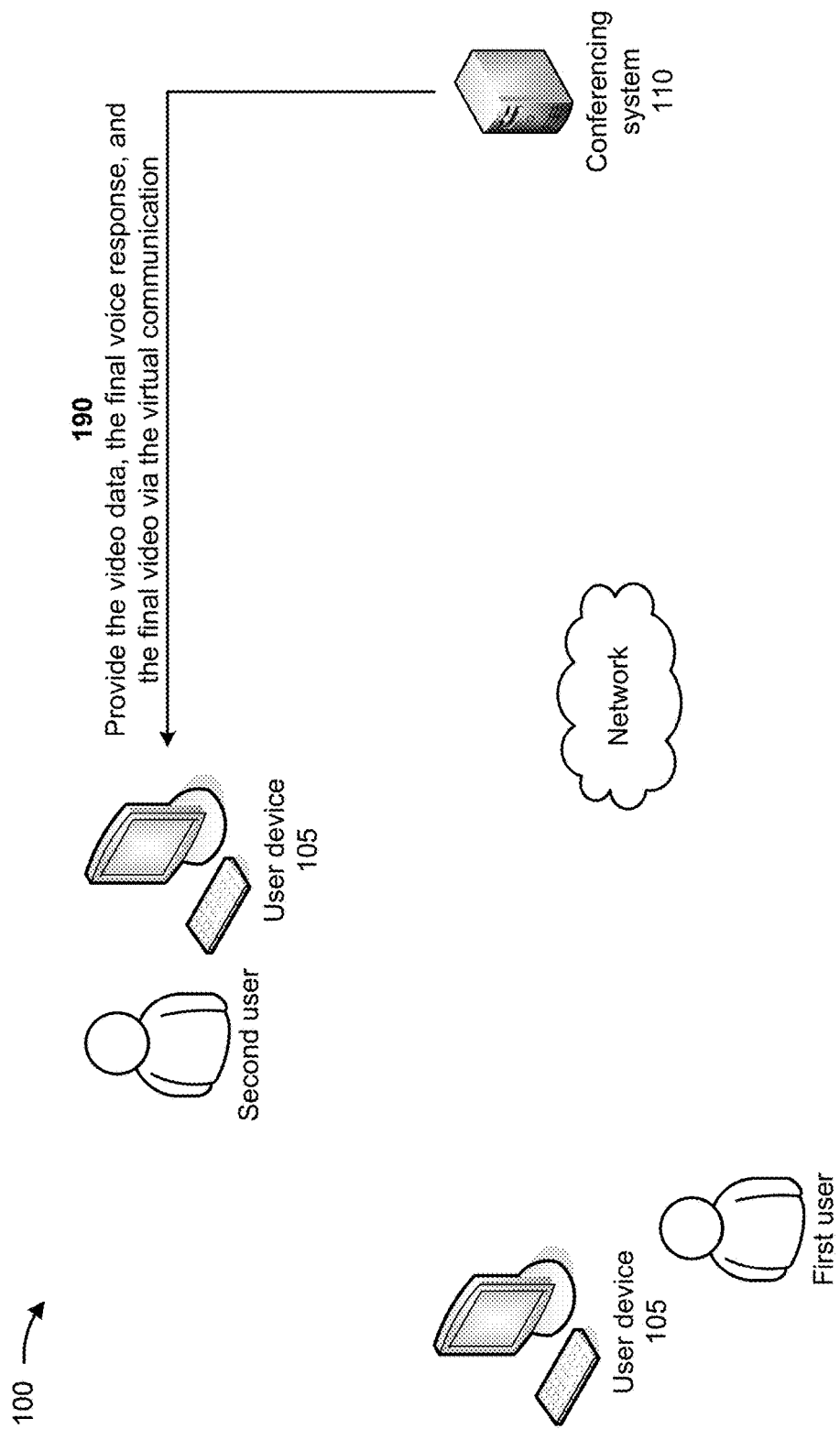

As shown in FIG. 1L, and by reference number 190, the conferencing system 110 may provide the video data, the final voice response, and the final video via the virtual communication. For example, the conferencing system 110 may provide the video data, the final voice response, and the final video via the virtual communication to the second user device 105, and the second user device 105 may play the video data, the final voice response, and the final video to the second user. In some implementations, when providing the video data, the final voice response, and the final video via the virtual communication to the second user device 105, the conferencing system 110 may broadcast the final voice response over a portion of the video data associated with the missing voice packets and may broadcast the final video over a portion of the video data associated with the missing image packets.

In this way, the conferencing system 110 reconstructs video data using contextually-aware multi-modal generation during signal loss. For example, the conferencing system 110 may receive video data that includes a text transcript, audio sequences, and image frames and may detect a network fluctuation based on the video data. The conferencing system 110 may generate a new phrase based on the text transcript and may generate a response phoneme based on the new phrase. The conferencing system 110 may generate a text embedding based on the response phoneme and may generate a target voice sequence based on the audio sequences. The conferencing system 110 may generate an audio embedding based on the target voice sequence and may generate a target image sequence based on the image frames. The conferencing system 110 may generate an image embedding based on the target image sequence and may combine the text embedding, the audio embedding, and the image embedding to generate an embedding input vector. The conferencing system 110 may generate a final voice response and a final video based on the embedding input vector and may provide the video data, the final voice response, and the final video via a virtual communication. Thus, the conferencing system 110 may conserve computing resources, networking resources, and/or other resources that would have otherwise been consumed by failing to provide quality video to user devices, resulting in a poor user experience and lost or misunderstood context, losing or dropping packets associated with the video, handling complaints from users associated with the user devices 105, and/or the like.

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
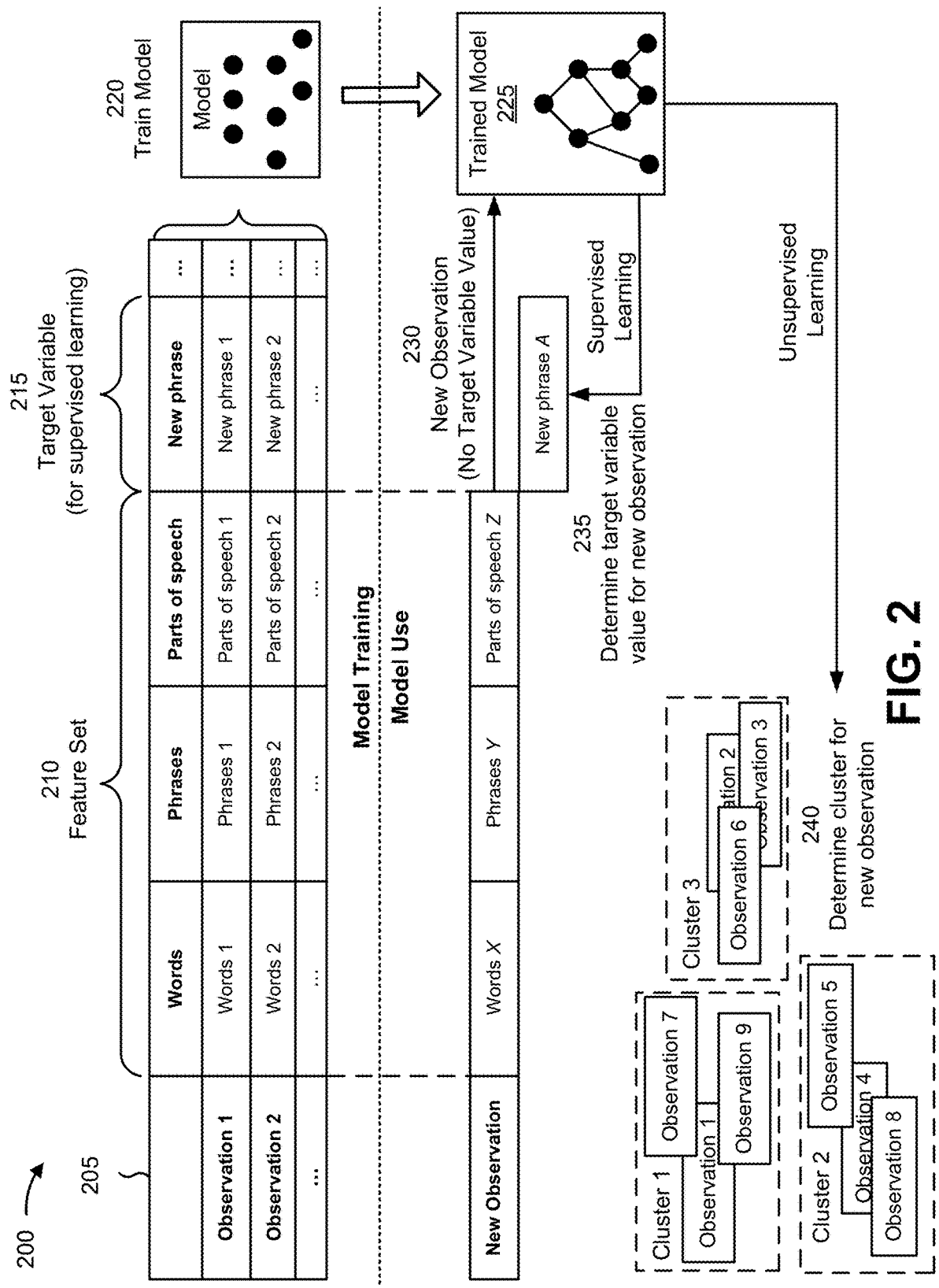
FIG. 2 is a diagram illustrating an example of training and using a machine learning model.

FIG. 2 is a diagram illustrating an example 200 of training and using a machine learning model to reconstruct video data using contextually-aware multi-modal generation during signal loss. The machine learning model training and usage described herein may be performed using a machine learning system. The machine learning system may include or may be included in a computing device, a server, a cloud computing environment, and/or the like, such as the conferencing system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the conferencing system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the conferencing system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of words, a second feature of phrases, a third feature of parts of speech, and so on. As shown, for a first observation, the first feature may have a value of words 1, the second feature may have a value of phrases 1, the third feature may have a value of parts of speech 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labeled "new phrase" and may include a value of new phrase 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of words X, a second feature of phrases Y, a third feature of parts of speech Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of new phrase A for the target variable of the new phrase for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a words cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a phrases cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to reconstruct video data using contextually-aware multi-modal generation during signal loss. The machine learning system enables recognition and/or identification of tens, hundreds, thousands, or millions of features and/or feature values for tens, hundreds, thousands, or millions of observations, thereby increasing accuracy and consistency and reducing delay associated with reconstructing video data using contextually-aware multi-modal generation during signal loss relative to requiring computing resources to be allocated for tens, hundreds, or thousands of operators to manually reconstruct video data using contextually-aware multi-modal generation during signal loss.

As indicated above, FIG. 2 is provided as an example. Other examples may differ from what is described in connection with FIG. 2.

Figure 3:
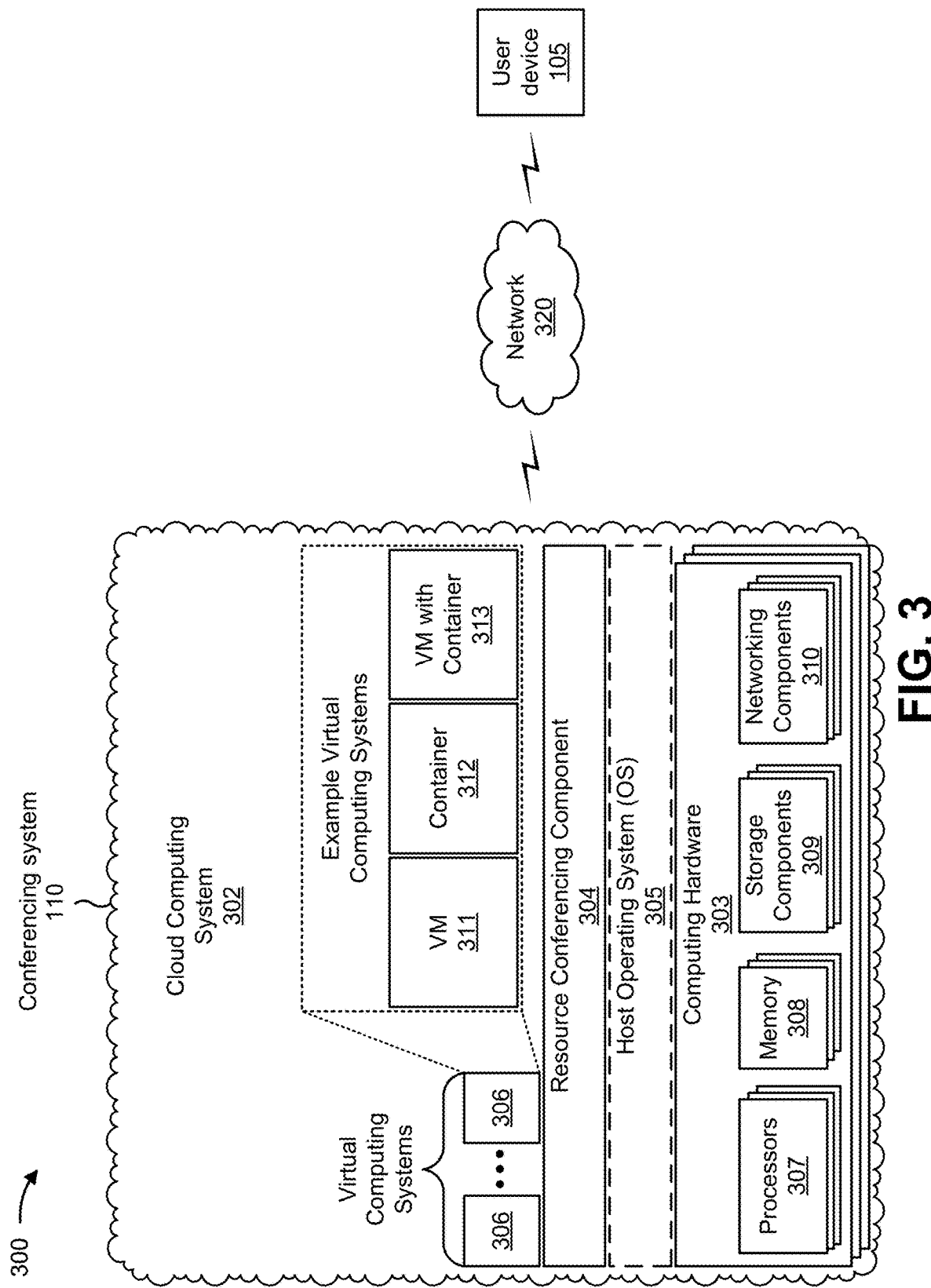
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the conferencing system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), an autonomous vehicle, or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the conferencing system 110 may include one or more elements 303-313 of the cloud computing system 302, may execute within the cloud computing system 302, and/or may be hosted within the cloud computing system 302, in some implementations, the conferencing system 110 may not be cloud-based (e.g., may be implemented outside of a cloud computing system) or may be partially cloud-based. For example, the conferencing system 110 may include one or more devices that are not part of the cloud computing system 302, such as the device 400 of FIG. 4, which may include a standalone server or another type of computing device. The conferencing system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
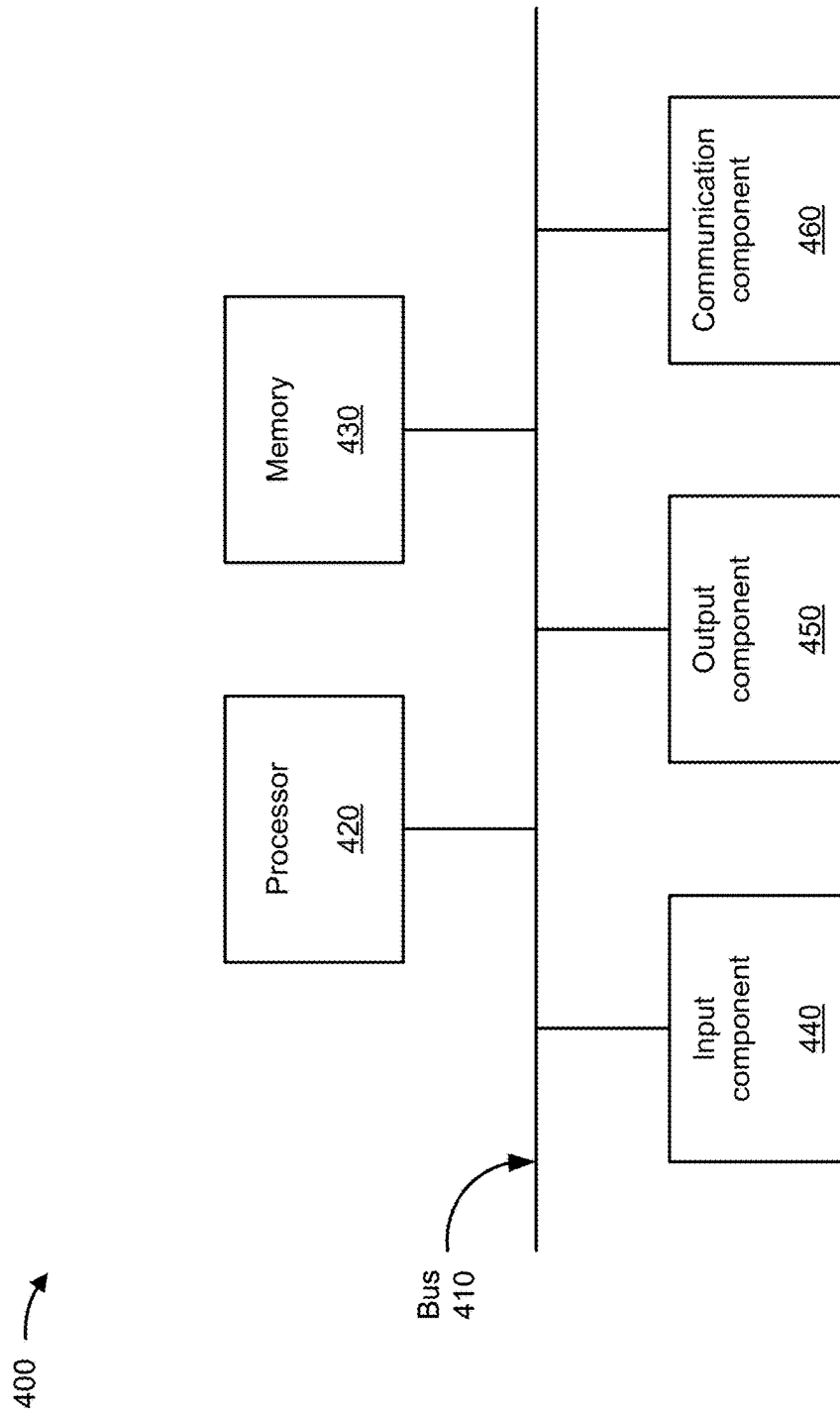
FIG. 4 is a diagram of example components of one or more devices of FIG. 3.

FIG. 4 is a diagram of example components of a device 400, which may correspond to the user device 105 and/or the conferencing system 110. In some implementations, the user device 105 and/or the conferencing system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
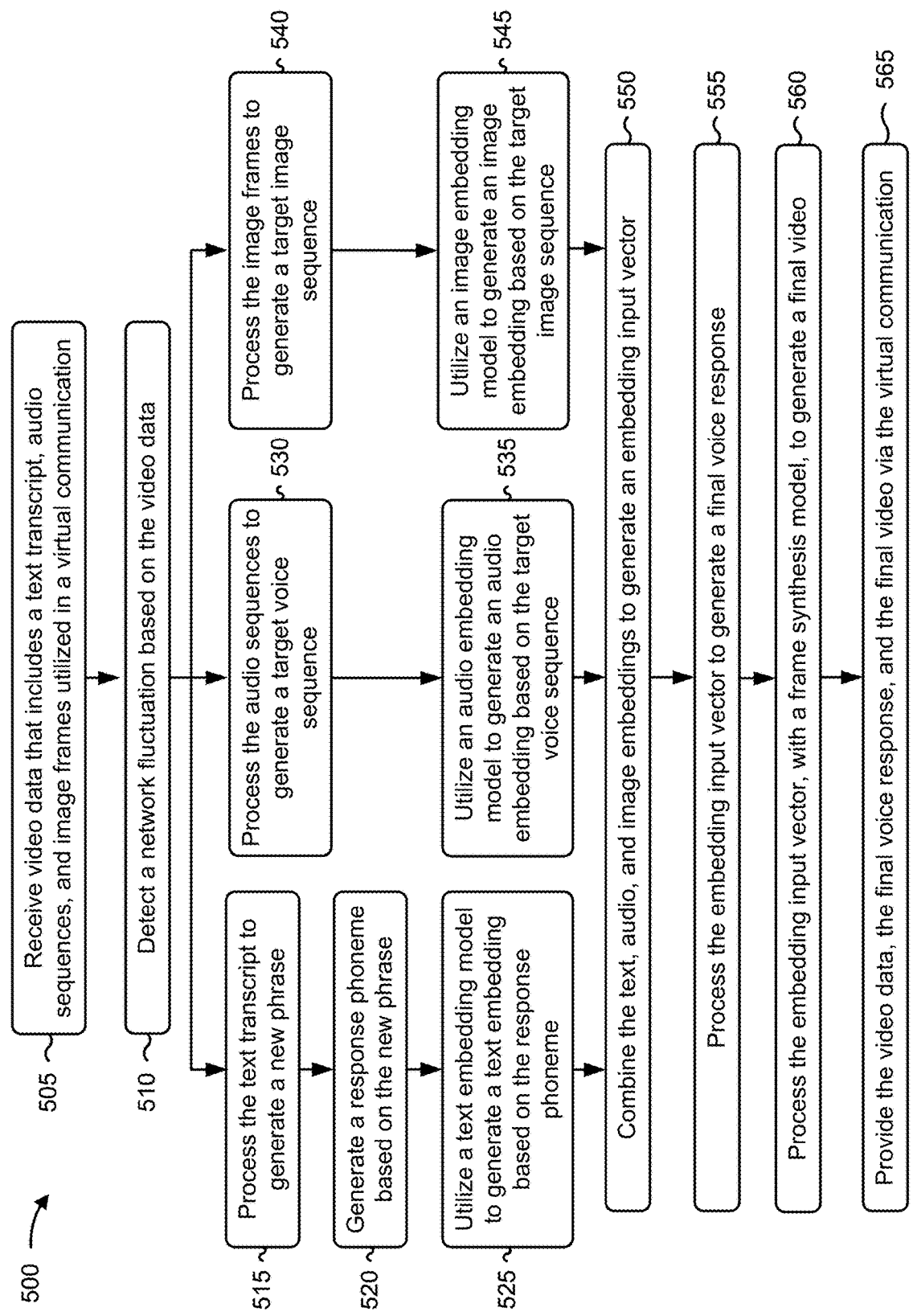
FIG. 5 is a flowchart of an example process for reconstructing video data using contextually-aware multi-modal generation during signal loss.

FIG. 5 is a flowchart of an example process 500 for reconstructing video data using contextually-aware multimodal generation during signal loss. In some implementations, one or more process blocks of FIG. 5 may be performed by a device (e.g., the conferencing system 110). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving video data that includes a text transcript, audio sequences, and image frames utilized in a virtual communication (block 505). For example, the device may receive video data that includes a text transcript, audio sequences, and image frames utilized in a virtual communication, as described above. In some implementations, the virtual communication is one of a video conference, a virtual meeting, or a video call.

As further shown in FIG. 5, process 500 may include detecting a network fluctuation based on the video data (block 510). For example, the device may detect a network fluctuation based on the video data, as described above.

As further shown in FIG. 5, process 500 may include processing the text transcript, based on the network fluctuation and with a language model, to generate a new phrase (block 515). For example, the device may process the text transcript, based on the network fluctuation and with a language model, to generate a new phrase, as described above. In some implementations, the language model is an encoder-decoder model that determines relationships between different words and phrases and that represents words while maintaining connections between the words.

As further shown in FIG. 5, process 500 may include generating a response phoneme based on the new phrase (block 520). For example, the device may generate a response phoneme based on the new phrase, as described above. In some implementations, generating the response phoneme based on the new phrase comprises processing the new phrase, with one of an epitran model, a phonemizer model, or a toPhonetics model, to generate the response phoneme.

As further shown in FIG. 5, process 500 may include utilizing a text embedding model to generate a text embedding based on the response phoneme (block 525). For example, the device may utilize a text embedding model to generate a text embedding based on the response phoneme, as described above. In some implementations, the text embedding model is a text classification neural network model without a dense layer and an output layer.

As further shown in FIG. 5, process 500 may include processing the audio sequences, based on the network fluctuation and with the language model, to generate a target voice sequence (block 530). For example, the device may process the audio sequences, based on the network fluctuation and with the language model, to generate a target voice sequence, as described above.

As further shown in FIG. 5, process 500 may include utilizing an audio embedding model to generate an audio embedding based on the target voice sequence (block 535). For example, the device may utilize an audio embedding model to generate an audio embedding based on the target voice sequence, as described above. In some implementations, the audio embedding model is an audio classification neural network model without a dense layer and an output layer.

As further shown in FIG. 5, process 500 may include processing the image frames, based on the network fluctuation and with an image model, to generate a target image sequence (block 540). For example, the device may process the image frames, based on the network fluctuation and with an image model, to generate a target image sequence, as described above.

As further shown in FIG. 5, process 500 may include utilizing an image embedding model to generate an image embedding based on the target image sequence (block 545). For example, the device may utilize an image embedding model to generate an image embedding based on the target image sequence, as described above. In some implementations, the image embedding model is an image classification neural network model without a dense layer and an output layer. In some implementations, each of the text embedding model, the audio embedding model, and the image embedding model is a sequential multilayer perceptron model.

As further shown in FIG. 5, process 500 may include combining the text embedding, the audio embedding, and the image embedding to generate an embedding input vector (block 550). For example, the device may combine the text embedding, the audio embedding, and the image embedding to generate an embedding input vector, as described above. In some implementations, combining the text embedding, the audio embedding, and the image embedding to generate an embedding input vector includes concatenating the text embedding, the audio embedding, and the image embedding to generate the embedding input vector.

As further shown in FIG. 5, process 500 may include processing the embedding input vector, with an audio synthesis model, to generate a final voice response (block 555). For example, the device may process the embedding input vector, with an audio synthesis model, to generate a final voice response, as described above. In some implementations, processing the embedding input vector, with the audio synthesis model, to generate the final voice response includes processing the embedding input vector, with the audio synthesis model, to generate an audio spectrogram, and converting the audio spectrogram into the final voice response. In some implementations, processing the embedding input vector, with the audio synthesis model, to generate the final voice response includes processing the embedding input vector, with the audio synthesis model, to generate an array sequence, and converting the array sequence into the final voice response.

As further shown in FIG. 5, process 500 may include processing the embedding input vector, with a frame synthesis model, to generate a final video (block 560). For example, the device may process the embedding input vector, with a frame synthesis model, to generate a final video, as described above. In some implementations, the final video includes one or more image frames depicting at least a face of a user.

As further shown in FIG. 5, process 500 may include providing the video data, the final voice response, and the final video via the virtual communication (block 565). For example, the device may provide the video data, the final voice response, and the final video via the virtual communication, as described above. In some implementations, providing the video data, the final voice response, and the final video via the virtual communication includes broadcasting the final voice response and the final video over a portion of the video data associated with missing voice packets and missing image packets.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, video data that includes a text transcript, audio sequences, and image frames utilized in a virtual communication;
   detecting, by the device, a network fluctuation based on the video data;
   processing, by the device, the text transcript, based on the network fluctuation and with a language model, to generate a new phrase;
   generating, by the device, a response phoneme based on the new phrase;
   utilizing, by the device, a text embedding model to generate a text embedding based on the response phoneme;
   processing, by the device, the audio sequences, based on the network fluctuation and with the language model, to generate a target voice sequence;
   utilizing, by the device, an audio embedding model to generate an audio embedding based on the target voice sequence;
   processing, by the device, the image frames, based on the network fluctuation and with an image model, to generate a target image sequence;

utilizing, by the device, an image embedding model to generate an image embedding based on the target image sequence;
combining, by the device, the text embedding, the audio embedding, and the image embedding to generate an embedding input vector;
processing, by the device, the embedding input vector, with an audio synthesis model, to generate a final voice response;
processing, by the device, the embedding input vector, with a frame synthesis model, to generate a final video; and
providing, by the device, the video data, the final voice response, and the final video via the virtual communication.

2. The method of claim 1, wherein the language model is an encoder-decoder model that determines relationships between different words and phrases and that represents words while maintaining connections between the words.

3. The method of claim 1, wherein generating the response phoneme based on the new phrase comprises:
processing the new phrase, with one of an epitran model, a phonemizer model, or a toPhonetics model, to generate the response phoneme.

4. The method of claim 1, wherein the text embedding model is a text classification neural network model without a dense layer and an output layer.

5. The method of claim 1, wherein the audio embedding model is an audio classification neural network model without a dense layer and an output layer.

6. The method of claim 1, wherein the image embedding model is an image classification neural network model without a dense layer and an output layer.

7. The method of claim 1, wherein each of the text embedding model, the audio embedding model, and the image embedding model is a sequential multilayer perceptron model.

8. A device, comprising:
one or more processors configured to:
receive video data that includes a text transcript, audio sequences, and image frames utilized in a virtual communication;
detect a network fluctuation based on the video data;
process the text transcript, based on the network fluctuation and with a language model, to generate a new phrase,
wherein the language model is an encoder-decoder model that determines relationships between different words and phrases and that represents words while maintaining connections between the words;
generate a response phoneme based on the new phrase;
utilize a text embedding model to generate a text embedding based on the response phoneme;
process the audio sequences, based on the network fluctuation and with the language model, to generate a target voice sequence;
utilize an audio embedding model to generate an audio embedding based on the target voice sequence;
process the image frames, based on the network fluctuation and with an image model, to generate a target image sequence;
utilize an image embedding model to generate an image embedding based on the target image sequence;
combine the text embedding, the audio embedding, and the image embedding to generate an embedding input vector;
process the embedding input vector, with an audio synthesis model, to generate a final voice response;
process the embedding input vector, with a frame synthesis model, to generate a final video; and
provide the video data, the final voice response, and the final video via the virtual communication.

9. The device of claim 8, wherein the one or more processors, to process the embedding input vector, with the audio synthesis model, to generate the final voice response, are configured to:
process the embedding input vector, with the audio synthesis model, to generate an audio spectrogram; and
convert the audio spectrogram into the final voice response.

10. The device of claim 8, wherein the one or more processors, to process the embedding input vector, with the audio synthesis model, to generate the final voice response, are configured to:
process the embedding input vector, with the audio synthesis model, to generate an array sequence; and
convert the array sequence into the final voice response.

11. The device of claim 8, wherein the one or more processors, to provide the video data, the final voice response, and the final video via the virtual communication, are configured to:
broadcast the final voice response and the final video over a portion of the video data associated with missing voice packets and missing image packets.

12. The device of claim 8, wherein the virtual communication is one of a video conference, a virtual meeting, or a video call.

13. The device of claim 8, wherein the final video includes one or more image frames depicting at least a face of a user.

14. The device of claim 8, wherein the one or more processors, to combine the text embedding, the audio embedding, and the image embedding to generate an embedding input vector, are configured to:
concatenate the text embedding, the audio embedding, and the image embedding to generate the embedding input vector.

15. A non-transitory computer-readable medium storing a set of instructions, the set of instructions comprising:
one or more instructions that, when executed by one or more processors of a device, cause the device to:
receive video data that includes a text transcript, audio sequences, and image frames utilized in a virtual communication,
wherein the virtual communication is one of a video conference, a virtual meeting, or a video call;
detect a network fluctuation based on the video data;
process the text transcript, based on the network fluctuation and with a language model, to generate a new phrase;
generate a response phoneme based on the new phrase;
utilize a text embedding model to generate a text embedding based on the response phoneme;
process the audio sequences, based on the network fluctuation and with the language model, to generate a target voice sequence;
utilize an audio embedding model to generate an audio embedding based on the target voice sequence;
process the image frames, based on the network fluctuation and with an image model, to generate a target image sequence;
utilize an image embedding model to generate an image embedding based on the target image sequence;

combine the text embedding, the audio embedding, and the image embedding to generate an embedding input vector;

process the embedding input vector, with an audio synthesis model, to generate a final voice response;

process the embedding input vector, with a frame synthesis model, to generate a final video; and provide the video data, the final voice response, and the final video via the virtual communication.

16. The non-transitory computer-readable medium of claim 15, wherein the one or more instructions, that cause the device to generate the response phoneme based on the new phrase, cause the device to:

process the new phrase, with one of an epitran model, a phonemizer model, or a toPhonetics model, to generate the response phoneme.

17. The non-transitory computer-readable medium of claim 15, wherein the image embedding model is an image classification neural network model without a dense layer and an output layer.

18. The non-transitory computer-readable medium of claim 15, wherein each of the text embedding model, the audio embedding model, and the image embedding model is a sequential multilayer perceptron model.

19. The non-transitory computer-readable medium of claim 15, wherein the one or more instructions, that cause the device to provide the video data, the final voice response, and the final video via the virtual communication, cause the device to:

broadcast the final voice response and the final video over a portion of the video data associated with missing voice packets and missing image packets.

20. The non-transitory computer-readable medium of claim 15, wherein the one or more instructions, that cause the device to combine the text embedding, the audio embedding, and the image embedding to generate an embedding input vector, cause the device to:

concatenate the text embedding, the audio embedding, and the image embedding to generate the embedding input vector.

* * * * *